United States Patent [19]
Hansen et al.

[11] Patent Number: 5,420,489
[45] Date of Patent: May 30, 1995

[54] ROBOTIC END-EFFECTOR WITH ACTIVE SYSTEM COMPLIANCE AND MICRO-POSITIONING CAPABILITY

[75] Inventors: Joseph M. Hansen, Burbank; Davoud Manouchehri, Huntington Beach; Walter T. Appleberry; Thomas S. Lindsay, both of Long Beach, all of Calif.

[73] Assignee: Rockwell International Corporation, Seal Beach, Calif.

[21] Appl. No.: 150,297

[22] Filed: Nov. 12, 1993

[51] Int. Cl.$^6$ .................................. G05D 11/08
[52] U.S. Cl. ........................... 318/568.18; 318/568.1; 318/568.21; 901/29; 901/30
[58] Field of Search ................. 318/560–646; 395/80–99; 901/3, 5, 7, 9, 15, 20, 21, 23, 25, 27, 29, 33, 35, 37, 41, 45, 47, 30; 444/730, 731, 735, 737

[56] References Cited

U.S. PATENT DOCUMENTS

| | | | |
|---|---|---|---|
| 4,736,519 | 4/1988 | Roberts | 29/771 |
| 4,765,011 | 8/1988 | Leeper | 12/1 A |
| 4,921,292 | 5/1990 | Harwell et al. | 294/65.5 |
| 4,993,139 | 2/1991 | Burry et al. | 29/568 |
| 5,160,877 | 11/1992 | Fujiwara et al. | 318/568.21 |

*Primary Examiner*—Paul Ip
*Attorney, Agent, or Firm*—Lawrence N. Ginsberg; Charles T. Silberberg

[57] ABSTRACT

The robotic end-effector system comprises a mounting bracket assembly attached to a manipulator arm of a robot. A dual shaft motor is attached to the mounting bracket assembly. The motor has first and second rotatable output shafts. The first shaft is for mounting an encoder for providing position data. A mechanical drive mechanism is connected to the motor and to the mounting bracket assembly. The mechanical drive mechanism converts rotational motion of the second output shaft to translational motion. A passive compliance system is connected to the mechanical drive mechanism. A load sensor system is supported by the compliance system for providing force data. An end-effector end piece is connected to the load sensor system. A closed loop computer control system is in communication with the motor for processing the position data and the force data for providing micro positioning of the end-effector end piece and for providing an active system compliance, thereby achieving the desired end-effector function.

14 Claims, 5 Drawing Sheets

ROBOTIC END-EFFECTOR WITH ACTIVE SYSTEM COMPLIANCE AND MICRO-POSITIONING CAPABILITY

BACKGROUND OF THE INVENTION

1. Field of the Invention

This invention relates to robotic end-effectors and more particularly to a robotic end-effector with an active system compliance and the ability for micro-positioning.

2. Description of the Related Art

A major component of the Space Shuttle Thermal Protection System (TPS) consists of approximately twenty thousand "ceramic" tiles located on the underside of the vehicle. If these tiles were allowed to absorb water, for example, from the humidity in the air, the water would freeze and the tiles would crack and possibly fall off during flight. To prevent this, each tile is manually injected with dimethylethoxysilane, (DMES) which evaporates during the heat of re-entry. Therefore, the injection process is repeated after every flight.

The present manual injection process is accomplished using a needle-less gun system that was designed and fabricated by Rockwell International Corporation. The technician places a room temperature vulcanizer (RTV) nozzle over a small pin-hole on the tile emittance ceramic coating and injects 2 cc of DMES into the tile. The injection is immediately followed by a 4 second high-pressure gaseous nitrogen (GN2) cycle that disperses the DMES as a gas throughout the internal tile volume. The gaseous form of DMES then reacts and bonds with the silica fibers inside the tile, rendering it waterproofed. On occasion, if an injection is unsuccessful, for example because the hole is plugged, the DMES fluid squirts out between the nozzle and tile rather than entering the tile through the pinhole. Additional technicians record the results of each injection on tile maps. DMES is flammable and hazardous. Technicians are required to wear organic vapor respirators, solvent impermeable gloves, face-shields/goggles, and smocks/coveralls. Because of the high volatility of DMES, the vapors disperse throughout the Orbiter Processing Facility (OPF). Re-waterproofing therefore occurs only during third shift, when few people are present. The entire process is time consuming and the technicians are susceptible to fatigue and errors. It has been very desirable, therefore, to automate the waterproofing of the Space Shuttle thermal protection system.

Several types of robotic end-effectors are known in the art. For example, a patent, search has revealed the following patents:

U.S. Pat. No. 4,955,654, issued to Tsuchihashi et al., discloses an end effector secured to a front end of a manipulator of a remote manipulator system and having a function for clamping dedicated objects, wherein a force applied to the end-effector at the time of clamping the dedicated object is detected so that a driving portion of the end-effector is feedback-controlled in order to protect the end-effector from being applied with a force (or torque) exceeding a predetermined level. The Tsuchihashi et al. device uses force feedback to prevent excessive force when the end-effector clamps a grapple fixture.

U.S. Pat. No. 3,952,880, issued to Hill et al., discloses an end effector, such as a hand, comprising a pair of jaws relatively pivotally movable between open and closed positions under operation of power means such as an electric motor. Sensing means, for sensing both magnitude and direction of forces along three mutually orthogonal axes intersecting at the wrist end for sensing magnitude and direction of torques about the axes, are provided at the wrist intermediate to the manipulator hand and hand supporting means. The sensing means includes a plurality of sensing units radially spaced from the longitudinal axis of the manipulator at equal distances therefrom.

Both Tsuchihashi et al. and Hill et al. references use force feedback to monitor the applied force. However, these devices do not de-couple the forces created by the manipulator from the object they are handling.

U.S. Pat. No. 5,172,922, issued to Kowaleski et al. and U.S. Pat. No. 4,945,979, issued to Cullen et al. disclose end effectors which utilize springs for self-aligning.

All of the aforementioned patents are required to be positioned by a manipulator arm. They lack the ability to self-position.

OBJECTS AND SUMMARY OF THE INVENTION

It is, therefore, a principal object of the present invention to provide active, system compliance of an end-effector. Another object is to provide an end-effector which can micro-position at the end of a manipulator arm of a robot.

Another object of the present invention is to provide an end-effector which is particularly adapted for use as a fluid delivery system.

Still another object is to provide a controlled force at the end of an end-effector.

These and other objects are achieved by the present invention, which is a robotic end-effector system. In its broadest aspects, the robotic end-effector system comprises a mounting bracket assembly attached to a manipulator arm of a robot. A dual shaft motor is attached to the mounting bracket assembly. The motor has first and second rotatable output shafts. The first shaft is for mounting an encoder for providing position data. A mechanical drive mechanism is connected to the motor and to the mounting bracket assembly. The mechanical drive mechanism converts rotational motion of the second output shaft to translational motion. A passive compliance system is connected to the mechanical drive mechanism. A load sensor system is supported by the compliance system for providing force data. An end-effector end piece is connected to the load sensor system. A closed loop computer control system is in communication with the motor for processing the position data and the force data for providing micro positioning of the end-effector end piece and for providing an active system compliance, thereby achieving the desired end-effector function.

As used herein, the term "passive compliance" refers to a compliance system with fixed dynamic characteristics.

An example of a preferred type of passive compliance system comprises a lower compliance plate assembly, an upper compliance plate assembly, spring means, a lower bearing assembly and an upper bearing assembly. The lower compliance plate assembly comprises a lower compliance plate connected to the mechanical drive mechanism, and a cylindrical can connected to a lower surface of the lower compliance plate. The upper compliance plate assembly comprises an upper compliance plate having a centrally located threaded vertical shaft extending from a lower surface thereof, an upper surface of the upper compliance plate being secured to the load sensor system. An adjustment nut is threaded on the vertical shaft for securing the upper compliance plate and for setting a compliance system initial preload force. An extension shaft is connected to a lower end of the vertical shaft for maintaining vertical alignment of the upper compliance plate.

The spring means provides compliance between the lower compliance plate assembly and the upper compliance plate assembly. The lower bearing assembly is positioned in a central opening in a lower end of the cylindrical can in cooperative engagement with the lower end of the extension shaft. The upper bearing assembly is positioned in a central opening in the lower compliance plate in cooperative engagement with the vertical shaft. The lower and upper bearing assemblies provide vertical translation of the upper compliance plate while limiting off-axis rotation of the upper compliance plate.

The mechanical drive mechanism may comprise, for example, a bar linkage assembly such as a six-bar linkage assembly. An alternate mechanical drive mechanism may include, for example, a rack and pinion assembly.

As used herein, the term "active system compliance" refers to the end-effector's ability to change its dynamic compliance characteristics.

The term "micro-positioning", as defined broadly herein, refers to the ability to move with at least 10 times better accuracy than that of the manipulator arm.

Although particularly adaptable for the automated re-waterproofing of spacecraft thermal protection systems, it is understood that this system is not limited to such a function and may be used for many applications where active system compliance and micropositioning capability is desired. For example, it may be used for mounting on the end of a large manipulator arm where fine positioning is required and cannot be properly provided by the arm itself. Another application is to use the end-effector to decouple the dynamics of a manipulator arm from the object it is in contact with. In view of these other utilities, it will be understood that the application regarding re-waterproofing is purely illustrative and not limiting in nature.

Other objects, advantages, and novel features of the present invention will become apparent from the following detailed description of the invention when considered in conjunction with the accompanying drawings.

BRIEF DESCRIPTION OF THE DRAWINGS

The same elements or parts throughout the figures of the drawings are designated by the same reference characters.

DETAILED DESCRIPTION OF THE PREFERRED EMBODIMENTS

Figure 1:
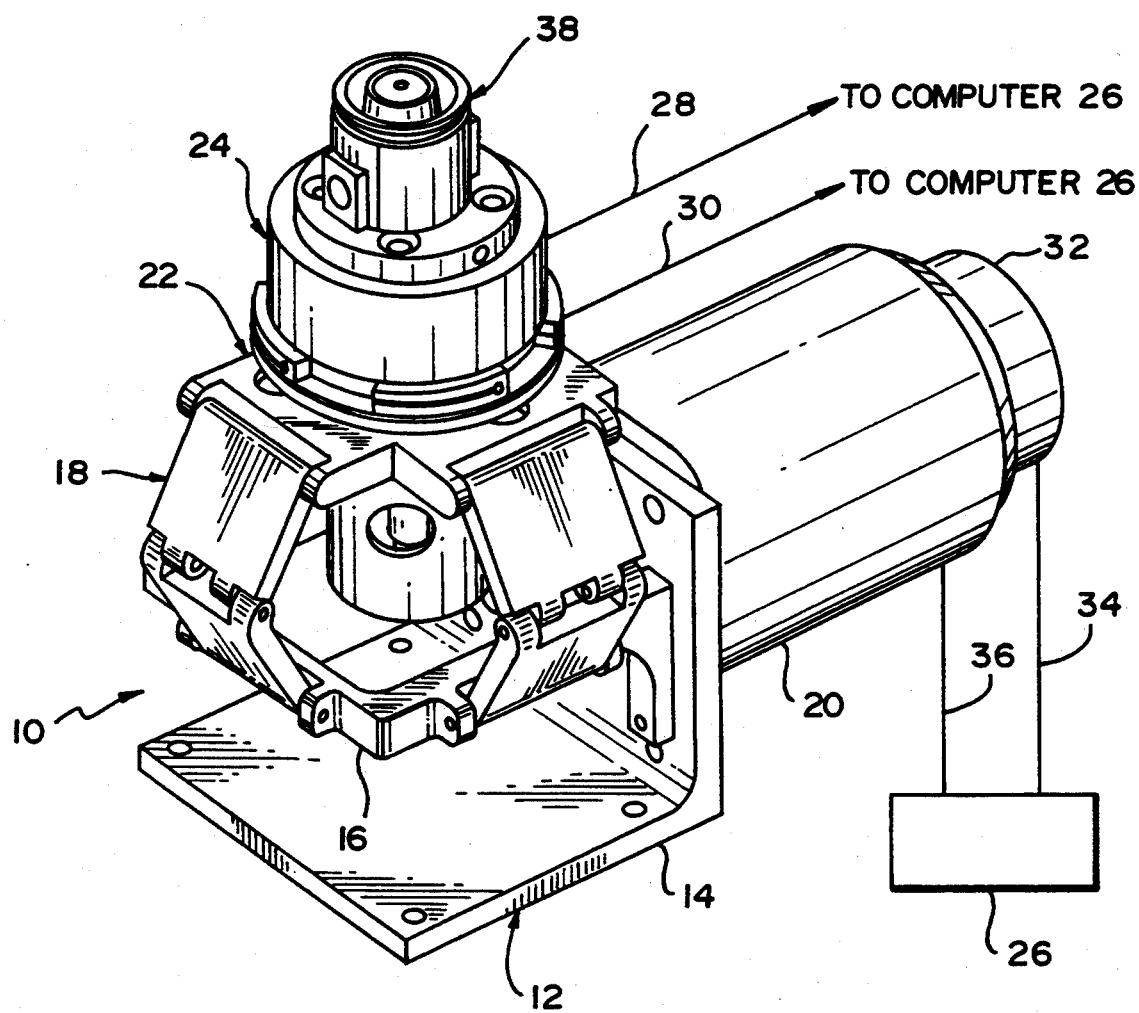
FIG. 1 is a front, right side perspective view of a preferred embodiment of the robotic end-effector system of the present invention.

Referring now to the drawings and the characters of reference marked thereon, FIG. 1 illustrates a preferred embodiment of the robotic end-effector system of the present invention, designated generally as 10.

A mounting bracket assembly, designated generally as 12 is attached to a manipulator arm of a robot (not shown). Mounting bracket assembly 12 includes a mounting bracket element 14 and a hinge support 16 mounted on the mounting bracket element 14. Hinge support 16 supports a mechanical drive mechanism, designated generally as 18. The mounting bracket element 14 also supports a dual shaft motor 20. The drive mechanism 18 is connected to a passive compliance system, designated generally as 22. A load sensor system, designated generally as 24, is supported by the passive compliance system 22 and provides force data to a computer 26, as indicated by arrows 28, 30. An end-effector end piece, designated generally as 38, is connected to the load sensor system 24. An encoder 32 is mounted on the motor 20 and provides position data to the computer 26, as indicated by line 34. The computer 26 can then provide appropriate signals so that the motor 20 can micro-position the end-effector end piece 38 and adjust the characteristics of the active system compliance, as indicated by line 36.

Figure 2:
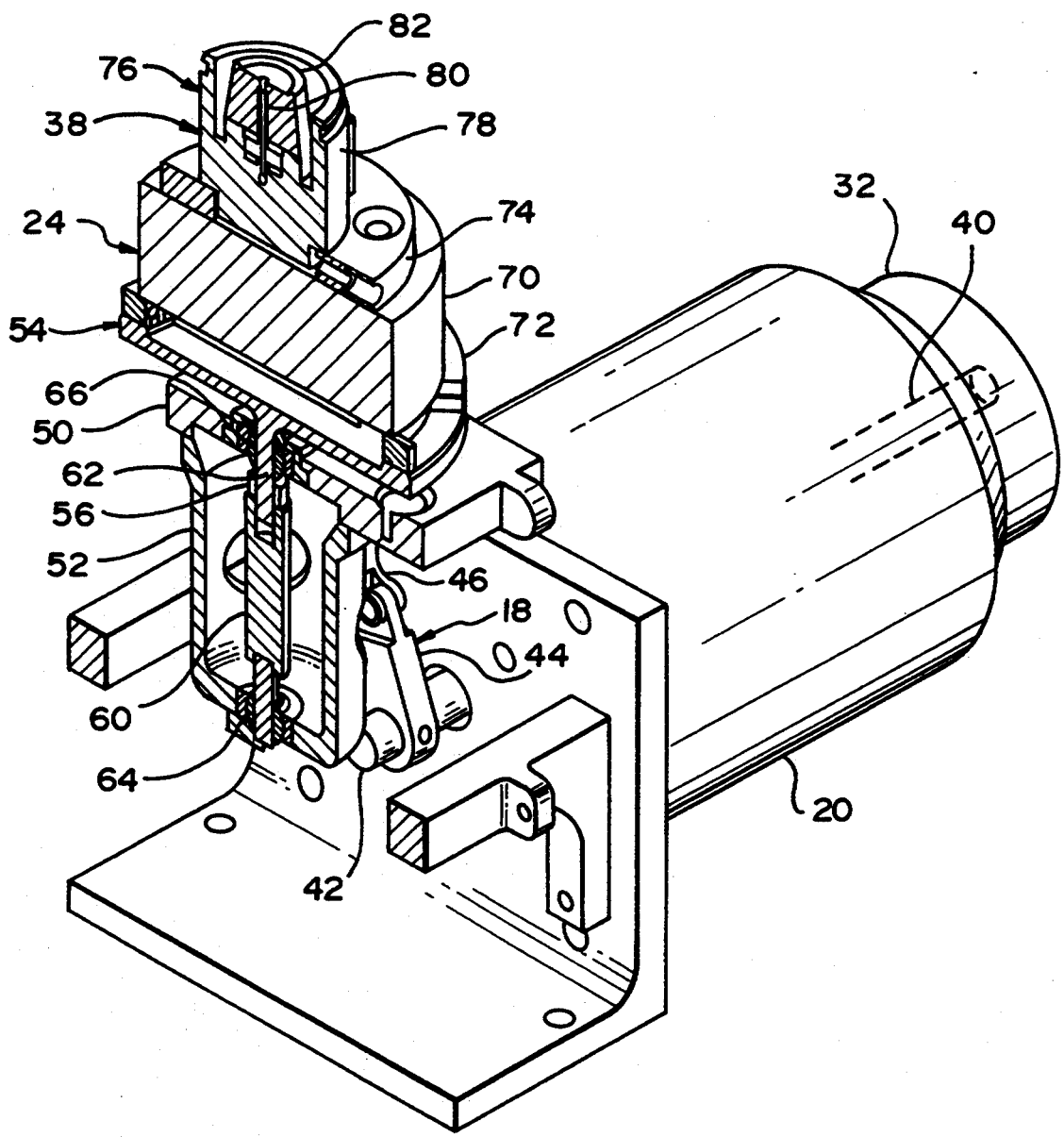
FIG. 2 is a cutaway, front, right side perspective view of this first embodiment with hinges and springs removed for greater clarity.

Referring now to FIG. 2, it can be seen that the dual shaft motor 20 includes a first rotatable output shaft 40 and a second rotatable output shaft 42. The motor 20 is preferably a d.c. brushless stepper motor. For Applicants' present use in re-waterproofing, the motor 20 is about 3.7 inches in length, has a weight of approximately 5 lbs. and has an output torque of about 260 oz.-inches. First output shaft 40 supports a portion of the encoder 32. Encoder 32 is preferably an incremental encoder with a resolution of about 2500 pulses per revolution.

The second output shaft 42 drives the mechanical drive mechanism 18.

Figure 3:
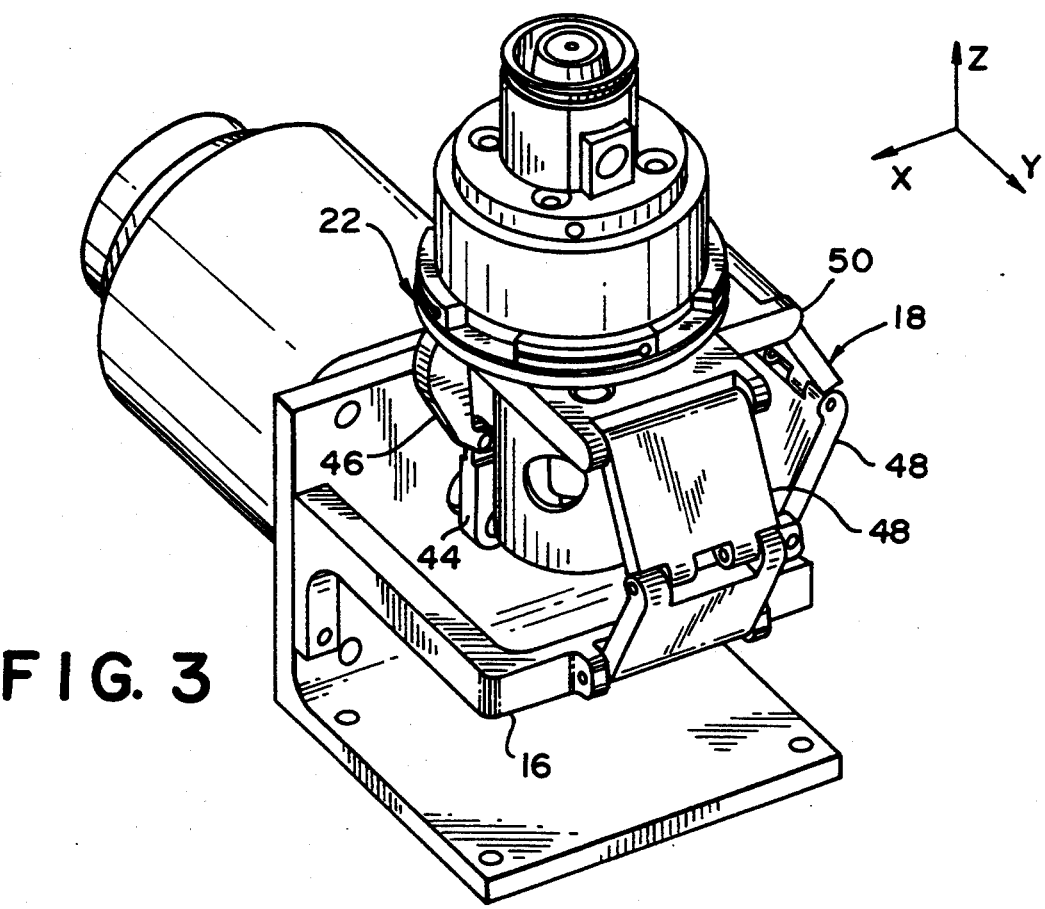
FIG. 3 is a front, left side perspective view of the same embodiment which is illustrated in FIG. 1, also showing the springs removed.

Referring now to FIG. 3, the drive mechanism 18 is readily seen to be a bar linkage assembly comprising a crank 44, which is attached to the second output shaft 42, a drag link 46 connected to the crank 44, and a plurality of hinges 48 connected to the hinge support 16. The embodiment shown is a six bar linkage assembly which comprises two hinges 48 which cooperate with the crank 44 and drag link 46. Even though such a six bar linkage assembly is illustrated, it is noted that other possible linkage configurations may be readily used instead.

Figure 4:
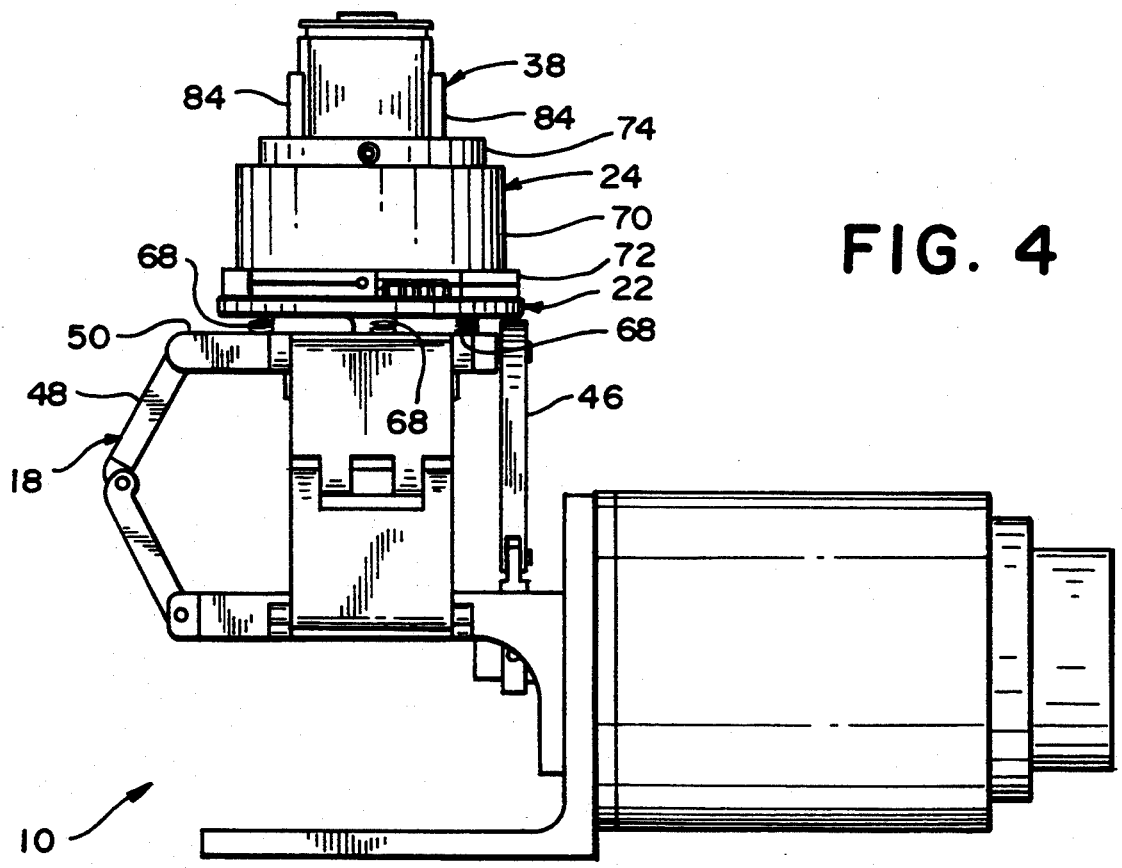
FIG. 4 is a side elevation view of the first embodiment.

Still referring to FIG. 3 and also to FIG. 4, it can be seen that the passive compliance system 22 comprises a lower compliance plate assembly including a lower compliance plate 50 connected to the upper end of hinge 48 and to the upper end of the drag link 46.

As can be best seen in FIG. 2, the lower compliance plate assembly also includes a cylindrical can 52 connected to a lower surface of the lower compliance plate 50. Can 52 is preferably attached to plate 50 by screws (not shown).

The passive compliance system comprises an upper compliance plate assembly including an upper compliance plate 54, an adjustment nut 56, and an extension shaft 60. Upper compliance plate 54 has a centrally located threaded vertical shaft 62 extending from a lower surface thereof. The upper surface of the upper compliance plate 54 is secured to the load sensor system 24.

The adjustment nut 56 is threaded on the vertical shaft 62 for securing the upper compliance plate 54 and for setting the passive compliance system initial preload. The extension shaft 60 is connected to the lower end of the vertical shaft 62 for maintaining vertical alignment of the upper compliance plate 54.

The passive compliance system 22 includes a lower bearing assembly 64 positioned in a central opening in a lower end of the cylindrical can 52 in cooperative engagement with the lower end of the extension shaft 60. The passive compliance system 22 also includes an upper bearing assembly 66 positioned in a central opening in the lower compliance plate 50 in cooperative engagement with the vertical shaft 62. The lower and upper bearing assemblies 64, 66 provide vertical translation of the upper compliance plate 54 while limiting off-axis rotation of the upper compliance plate 54.

Referring again now to FIG. 4, it can be seen that the passive compliance system also includes a plurality of springs 68 which provide compliance between the lower compliance plate assembly and the upper compliance plate assembly. (It is noted that in FIG. 2 the springs have been removed to more clearly illustrate the internal details of the end-effector system.) Although this embodiment has been shown with three springs, it is noted that a variety of other configurations may be suitable, based on the desired preload and traveling distance of the springs.

The load sensor system 24 comprises a three-axis load sensor 70 connected to the end-effector end piece 38. For Applicants' present application of re-waterproofing, the three-axis load sensor has a range of ±100 lbs. in the z-direction and a ±50 lb. range in the x and y directions. A single axis redundant load sensor 72 is preferably positioned between the three-axis load sensor 70 and the passive compliance system 22. Load sensor 72 is preferably provided as a back up in the event of the three-axis load sensor 70 failing. The redundant axis is in the z-direction.

Referring now to FIGS. 2 and 4, it can be seen that the end-effector end piece 38 comprises an adapter plate 74 connected to the load sensor system 24. The end piece 38 also includes a suction cup assembly, designated generally as 76 which is mounted on the adapter plate 74. Suction cup assembly 76 includes a suction cup element 78, a needle 80, and a RTV nozzle 82. Not shown is a seal which mounts on the outer lip of the suction cup 78. Two ports 84 are provided. One port 84 is used for delivering fluid, while another port 84 is used for removing any residual fluid through a vacuum line in the suction cup assembly 76.

Figure 5:
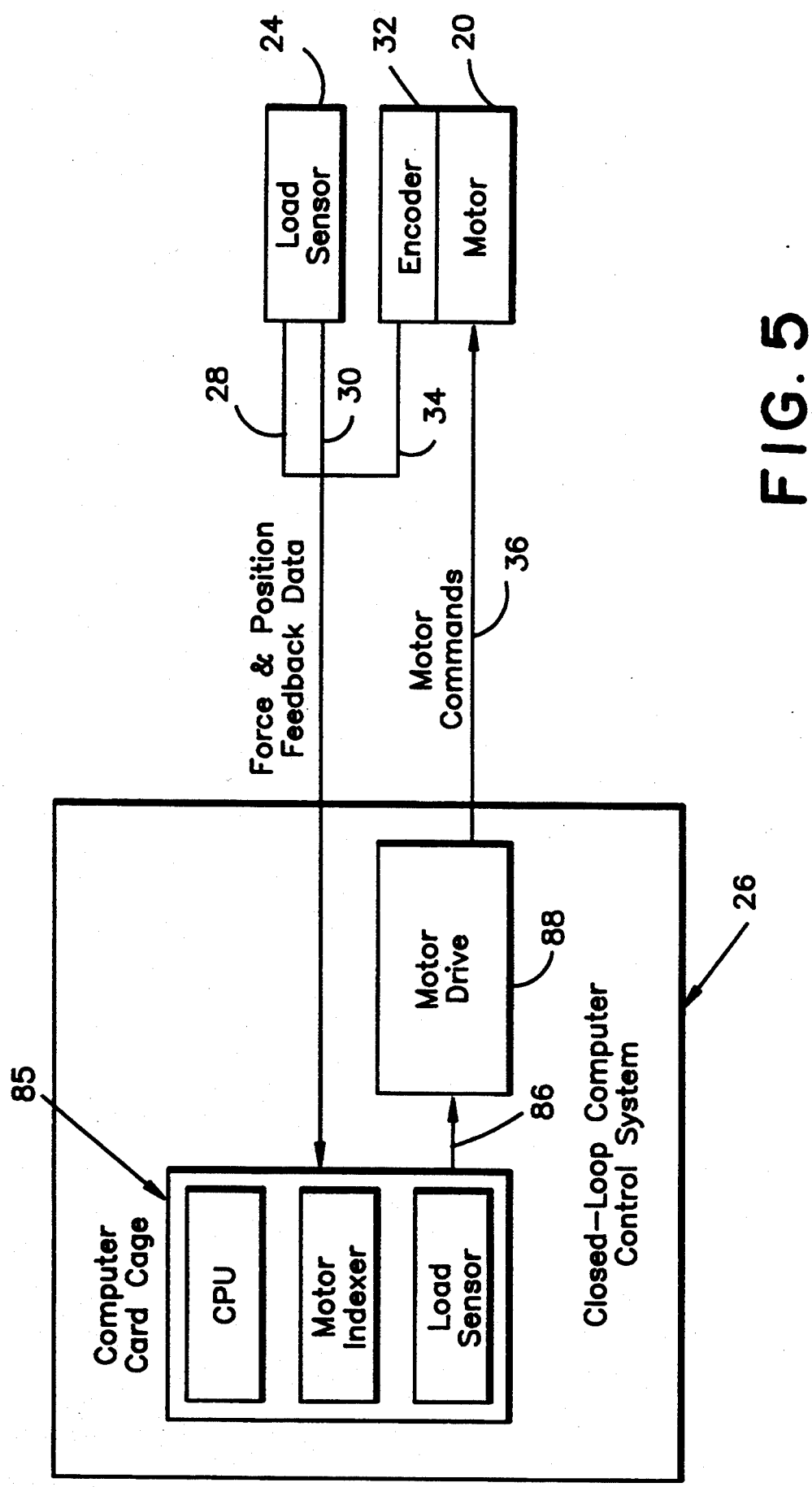
FIG. 5 is a block diagram of the control system of the present invention.

Referring now to FIG. 5, it can be seen that the computer controller 26 comprises a computer controller element 85 which processes force and position data, 28, 30 and 34, and issues commands 86 for micro-positioning or adjusting the active system compliance. The computer controller 26 also includes a motor drive 88 which amplifies the commands 36 to the motor 20.

In operation, the manipulator arm of the robot positions the end-effector 10 directly beneath a waterproofing hole in a tile. It then locks and maintains its correct position and will not move while the end-effector is in motion. The end-effector will be positioned about 1.8"±0.1" with a maximum of preferably about 2 degrees misalignment from its normal (z-axis) in its retracted position. At this point, the computer controller 26 receives a command from the controller of the manipulator arm to begin the waterproofing process.

The computer controller 26, prior to receiving the command from the manipulator arm, adjusts the active system compliance by changing the control system gains based on a force vs. distance model created on the previous run. This is necessary because the compliance of the nozzle 82 varies as it is exposed to DMES and requires an applied force adjustment.

The computer controller 26 initiates the sending of commands to the motor 20 based on a pre-defined velocity profile stored in memory allowing the motor to rotate as fast as possible without stalling. The motor shafts 40, 42 rotate, turning the crank 44 at the same speed. This, in turn, pushes the drag link 46 upward creating a rotational to translational conversion. The hinges 48, in turn, start opening, insuring that the motion remains linear. The velocity profile is designed to end when the tool reaches about 1.2 inches. From this point, the controller 26 commands the motor 20 using both force and position feedback 28, 30, 34. The end-effector 10 will continue to extend until making contact with the tile. It will apply a pre-defined load force on the tile. As it applies a load, it creates a force versus distance model which will be used to adjust the active system compliance of the end-effector for the next tile. In order to create a smooth model, the motor uses its ability to micro-position the end piece with linear displacements as small as 0.01±0.005. Once the objective force is reached, the control system maintains the force by compensating for any vibrations that may be induced from the manipulator arm. If a sudden large force is experienced by the end effector, the passive compliance system pre-load is exceeded and will absorb the initial force until the control system has a chance to make the appropriate adjustments. The DMES is then injected into the tile followed by up to 4 seconds of gaseous nitrogen. While the fluid and gas are injected, a vacuum line is removing any fluid which fails to enter the tile. Upon its completion, the motor moves the end-effector into its retracted position.

It is noted that the objective of the computer controller in the first embodiment described hereinabove is to apply and maintain a constant force on a tile isolating any vibrations detected from the manipulator arm. Furthermore, the controller uses a model to adjust the gains of the control system for changing the active system compliance as required. In contrast, with a second embodiment, which will be described below, the objective of the controller is to decouple the dynamics of the manipulator from anything connected or in contact with an end-effector end piece. Acceleration data, combined with force data is used to adjust the gains of the control system in real time. (Acceleration data may be provided by the use of accelerometers mounted above the upper compliance plate 24).

Figure 6:
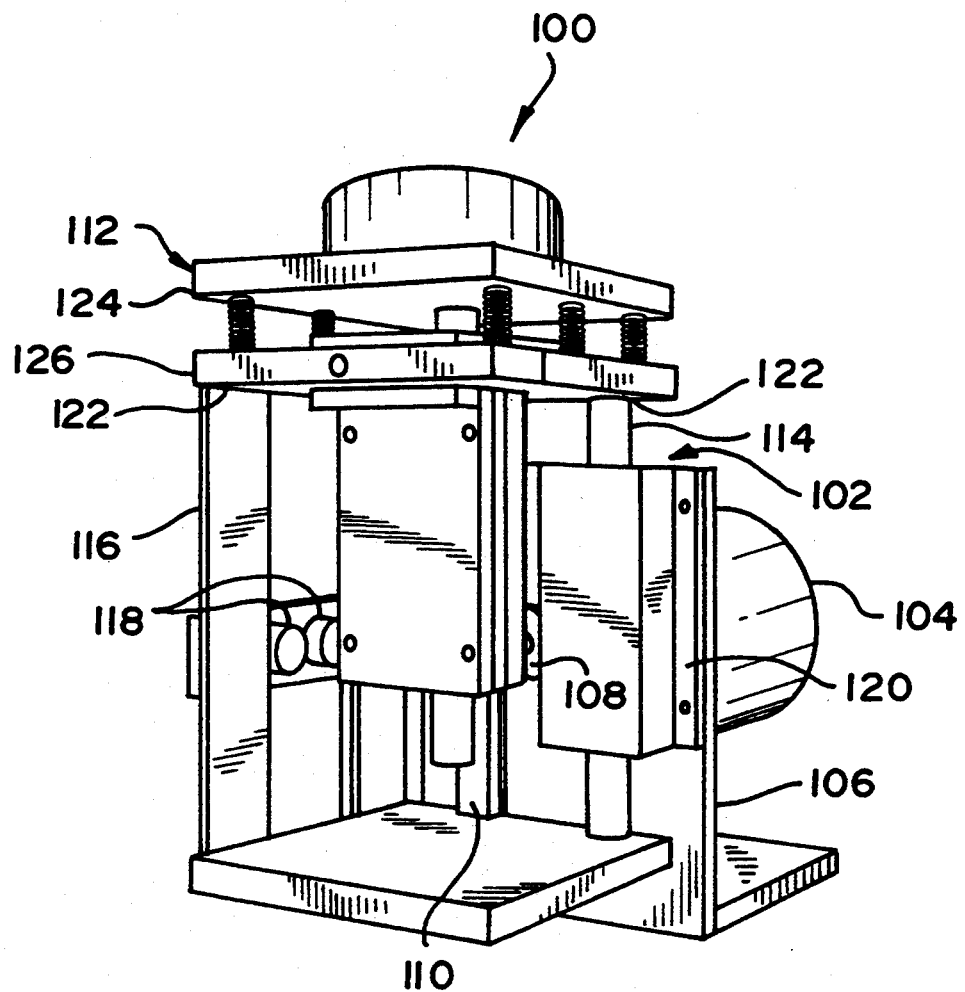
FIG. 6 is a front, right side perspective view of a second embodiment of the present invention which uses a rack and pinion mechanical drive mechanism.

Other suitable drive mechanisms may be utilized which embody the present inventive concept and provide additional inventive features. For example, referring now to FIG. 6, a second embodiment of the present invention is illustrated, designated generally as 100. This invention utilizes a rack and pinion mechanical drive mechanism. A rack and pinion assembly, designated generally as 102, is connected to a motor 104 and to a mounting bracket assembly 106. The rack and pinion assembly comprises a gear head 108 attached to an output shaft of the motor 104. A rack 110 has a first end in cooperative engagement with the gear head 108 and a second end connected to a passive compliance system, designated generally as 112. A linear bearing 114/track 116/guide wheel 118 assembly has an end 120 connected to the mounting bracket assembly 106 and another end 122 connected to the active compliance system 112.

As in the previous embodiment, the passive compliance system 112 includes an upper compliance plate 124 and a lower compliance plate 126.

Obviously, many modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. A robotic end-effector system, comprising:
   a) a mounting bracket assembly attached to a manipulator arm of a robot;
   b) a dual shaft motor attached to said mounting bracket assembly, said motor having first and second rotatable output shafts, said first shaft for mounting an encoder, for providing position data;
   c) a mechanical drive mechanism connected to said motor and to said mounting bracket assembly, said mechanical drive mechanism for converting rotational motion of said second output shaft to translational motion;
   d) a passive compliance system connected to said mechanical drive mechanism;
   e) a load sensor system supported by said compliance system for providing force data;
   f) an end-effector end piece connected to said load sensor system; and,
   g) a closed loop computer control system in communication with said motor for processing said position data and said force data for providing micro-positioning of said end-effector end piece and for providing an active system compliance, thereby achieving the desired end-effector function.

2. The robotic end-effector system of claim 1, wherein said passive compliance system comprises:
   a) a lower compliance plate assembly, comprising:
      i) a lower compliance plate connected to said mechanical drive mechanism; and,
      ii) a cylindrical can connected to a lower surface of said lower compliance plate;
   b) an upper compliance plate assembly comprising:
      i) an upper compliance plate having a centrally located threaded vertical shaft extending from a lower surface thereof, an upper surface of said upper compliance plate being secured to said load sensor system;
      ii) an adjustment nut threaded on said vertical shaft for securing said upper compliance plate and for setting a compliance system initial pre-load; and,
      iii) an extension shaft connected to a lower end of said vertical shaft for maintaining vertical alignment of said upper compliance plate;
   c) spring means for providing compliance between said lower compliance plate assembly and said upper compliance plate assembly;
   d) a lower bearing assembly positioned in a central opening in a lower end of said cylindrical can in cooperative engagement witch a lower end of said extension shaft; and,
   e) an upper bearing assembly positioned in a central opening in said lower compliance plate in cooperative engagement with said vertical shaft, said lower and upper bearing assemblies providing vertical translation of said upper compliance plate while limiting off-axis rotation of said upper compliance plate.

3. The robotic end-effector of claim 1, wherein said mechanical drive mechanism comprises:
   a bar linkage assembly connected to said motor and to said mounting bracket assembly, said bar linkage assembly, comprising:
   a) a crank attached to said second output shaft;
   b) a drag link having a first end connected to said crank and a second end connected to said passive compliance system; and,
   c) a plurality of hinges, each hinge having a first end connected to said mounting bracket assembly and a second end connected to said passive compliance system.

4. The robotic end-effector system of claim 3, wherein said plurality of hinges comprises two hinges which cooperate with said crank and drag link to form a 6-bar linkage assembly.

5. The robotic end-effector system of claim 1 wherein said mechanical drive mechanism comprises:
   a rack and pinion assembly connected to said motor and to said mounting bracket assembly, said rack and pinion assembly, comprising:
   a) a gear head attached to said second output shaft;
   b) a rack having a first end in cooperative engagement with said gear head and a second end connected to said passive compliance system; and,
   c) a linear bearing/track/guide wheel assembly having a first end connected to said mounting bracket assembly and a second end connected to said passive compliance system.

6. The robotic end-effector system of claim 1, wherein said load sensor system comprises:
   a three-axis load sensor connected to said end effector end piece; and,
   a single axis redundant load sensor positioned between said three-axis load sensor and said passive compliance system.

7. The robotic end-effector system of claim 1, wherein said motor comprises a d.c. brushless stepper motor.

8. The robotic end-effector system of claim 1, wherein said mounting bracket assembly comprises:
   a mounting bracket element attached to said manipulator arm of said robot; and
   a hinge support mounted on said mounting bracket element for supporting said mechanical drive mechanism.

9. The robotic end-effector system of claim 1, wherein said end-effector end piece comprises:
   an adapter plate connected to said load sensor system; and,
   a suction cup assembly mounted on said adapter plate, including a needle for delivering fluid.

10. The robotic end-effector system of claim 1, wherein said closed-loop computer control system comprises:
    a) a closed-loop computer control element for commanding said motor said micro-positioning of said end-effector end piece and for providing said active system compliance; and,
b) a motor drive for amplifying the commands from said computer control element and communicating these commands to said motor.

11. A robotic end-effector system, comprising:
a) a mounting bracket assembly attached to a manipulator arm of a robot;
b) a dual shaft motor attached to said mounting bracket assembly, said motor having first and second rotatable output shafts, said first shaft for mounting an encoder, for providing position data;
c) a mechanical drive mechanism comprising a bar linkage assembly connected to said motor and to said mounting bracket assembly, said bar linkage assembly, comprising:
  i) a crank attached to said second output shaft;
  ii) a drag link connected to said crank; and,
  iii) a plurality of hinges connected to said mounting bracket assembly;
d) a passive compliance system connected to ends of said plurality of hinges and to an end of said drag link;
e) a load sensor system supported by said compliance system for providing force data;
f) an end-effector end piece connected to said load sensor system; and
g) a closed loop computer control system in communication with said motor for processing said position data and said force data for providing micro-positioning of said end-effector end piece and for providing an active system compliance, thereby achieving the desired end-effector function.

12. A robotic end-effector system, comprising:
a) a mounting bracket assembly attached to a manipulator arm of a robot;
b) a dual shaft motor attached to said mounting bracket assembly, said motor having first and second rotatable output shafts, said first shaft for mounting an encoder, for providing position data;
c) a mechanical drive mechanism comprising a rack and pinion assembly connected to said motor and to said mounting bracket assembly, said rack and pinion assembly, comprising:
  i) a gear head attached to said second output shaft;
  ii) a rack in cooperative engagement with said gear head; and,
  iii) a linear bearing/track/guide wheel assembly in cooperative engagement with said mounting bracket assembly;
d) a passive compliance system connected to said ends of said rack and to an end of said linear bearing/track/guide wheel assembly;
e) a load sensor system supported by said compliance system for providing force data;
f) an end-effector end piece connected to said load sensor system; and
g) a closed loop computer control system in communication with said motor for processing said position data and said force data for providing micro-positioning of said end-effector end piece and for providing an active system compliance, thereby achieving the desired end-effector function.

13. A robotic end-effector for use with a robotic end-effector system of the type utilizing a closed loop computer control system which processes position and force data from said robotic end-effector for providing micro-positioning of an end-effector end piece and an active system compliance thereof, said robotic end-effector, comprising:
a) a mounting bracket assembly attached to a manipulator arm of a robot;
b) a dual shaft motor attached to said mounting bracket assembly, said motor having first and second rotatable output shafts, said first shaft for mounting an encoder, for providing position data;
c) a mechanical drive mechanism connected to said motor and to said mounting bracket assembly, said mechanical drive mechanism for converting rotational motion of said second output shaft to translational motion;
d) a passive compliance system connected to said mechanical drive mechanism;
e) a load sensor system supported by said compliance system for providing force data; and,
f) an end-effector end piece connected to said load sensor system for providing the desired end-effector function.

14. A robotic end-effector system for the automated re-waterproofing of spacecraft thermal protection systems, comprising:
a) a mounting bracket assembly attached to a manipulator arm of a robot;
b) a dual shaft motor attached to said mounting bracket assembly, said motor having first and second rotatable output shafts, said first shaft for mounting an encoder, for providing position data;
c) a mechanical drive mechanism connected to said motor and to said mounting bracket assembly, said mechanical drive mechanism for converting rotational motion of said second output shaft to translational motion;
d) a passive compliance system connected to said mechanical drive mechanism;
e) a load sensor system supported by said compliance system for providing force data;
f) an end-effector end piece connected to said load sensor system, said end-effector end piece comprising:
  i) an adapter plate connected to said load sensor system; and,
  ii) a suction cup assembly mounted on said adapter plate, said suction cup assembly comprising:
    a dual port suction cup element;
    a needle mounted to said suction cup element; and,
    a flexible nozzle attached to said needle; and,
g) a closed loop computer control system in communication with said motor for processing said position data and said force data for providing micro-positioning of said end-effector end piece and for providing an active system compliance, thereby achieving the desired end-effector function.

* * * * *